March 3, 1953 S. K. WEBSTER 2,630,498
AUDIO-FREQUENCY OUTPUT CONTROL CIRCUIT
Filed Sept. 9, 1949
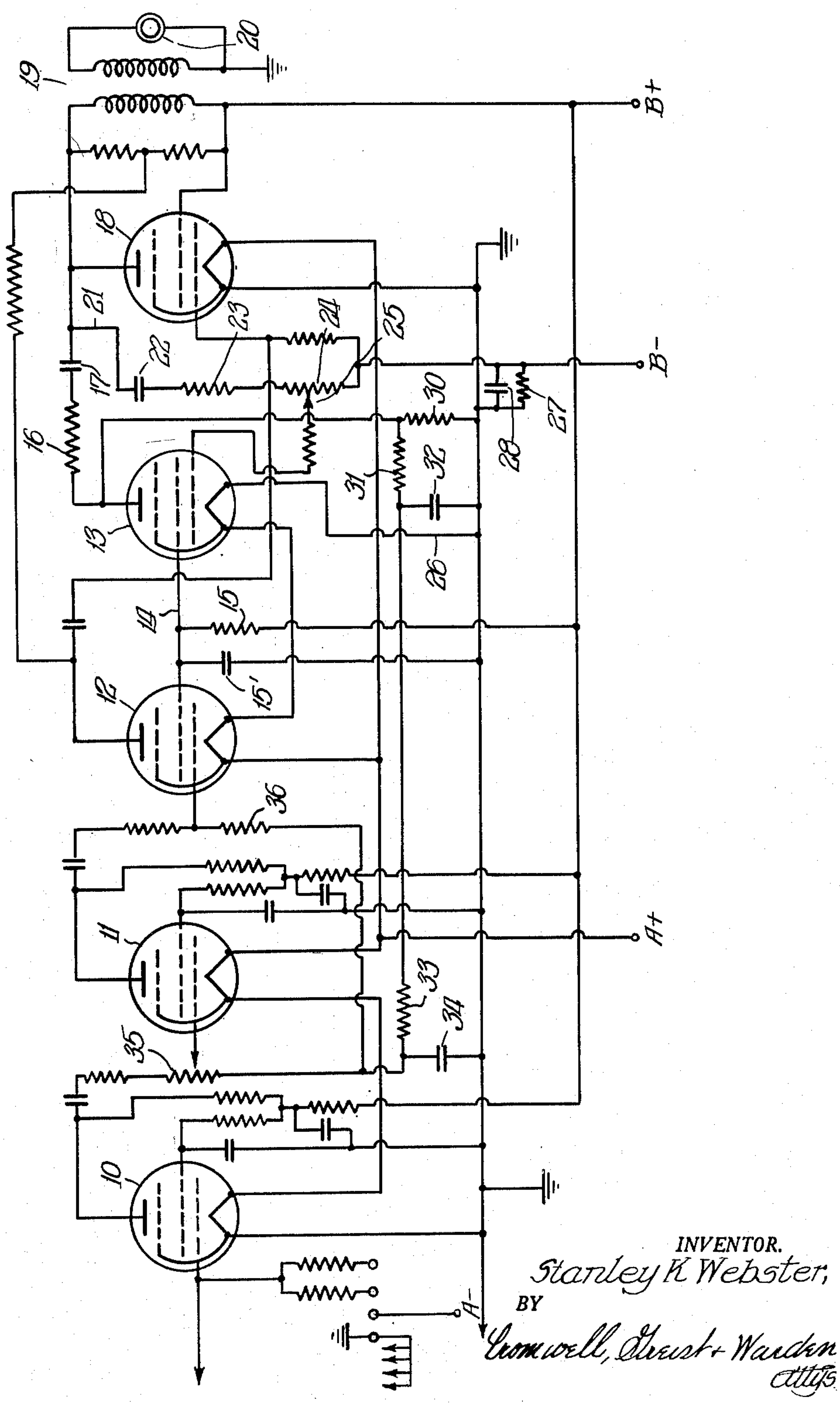
INVENTOR.
Stanley K Webster,
BY
Cromwell, Greist + Warden
Attys.

Patented Mar. 3, 1953

2,630,498

UNITED STATES PATENT OFFICE 2,630,498

AUDIO-FREQUENCY OUTPUT CONTROL CIRCUIT

Stanley K. Webster, Chicago, Ill., assignor to Otarion, Inc., Chicago, Ill., a corporation of Illinois Application September 9, 1949, Serial No. 114,780

1 Claim. (Cl. 179—171)

The present invention pertains to an improvement in audio-frequency amplifier circuits, for example, of the type employed in small, portable, electronic hearing aids. More particularly, the invention relates to a control circuit embodied in such an amplifying system, or in a related sort of system, for the purpose of moderating the power output and output voltage of that system, thereby, in the case of a hearing aid installation, safeguarding the user of the instrument against discomfort and annoyance or possible physical injury from sudden and marked output signal surges.

It is highly desirable in a power output control for hearing aid instruments which are battery operated at audio-frequencies that both the attack and recovery times of the control circuit be very rapid. Otherwise, in the case of slow performance of the power output moderating function, there is a possibility of physical injury to the user, not to mention a practical certainty of discomfort or annoyance. By the same token, an unduly slow recovery time results in unnecessary loss of signal volume immediately upon cessation of the objectionable power surge. Furthermore, the varying output level constitutes a somewhat distracting influence on the user unless the time constants are proper.

Conventional A. V. C. circuits employed in audio-frequency systems are inherently incapable of combining an acceptably fast attack and recovery, and power output limiting controls which are employed in radio-frequency work are not suitable, for one reason or another, in the particular type of miniature audio-frequency amplifier ordinarily employed in hearing aids.

Two general types of amplifier power output control are available for the purpose of maintaining the output, for example, at the ear piece of a standard, small, portable hearing aid instrument, within reasonable limits of comfort or user tolerance. These are the peak clipping method, by which provisions are made in the amplifier circuit to control the shape of the signal wave, and the volume compression method commonly utilized in automatic volume control hookups such as are applied to radio-frequency receiver circuits, in which control of the power output is effected by control of the gain at one or more of the amplifier stages.

These A. V. C. circuits, as presently embodied in conventional radio and audio-frequency receivers of different sorts, are unsuitable for a hearing aid installation. In such an installation a fast attack in the control operation is essential in order to avoid inflicting discomfort or actual injury on the user's ear by a sudden and violent surge in output power. A fast decay or recovery time is also highly desirable in the interest of preserving to the maximum extent consistent with the desired control action the faithful reproduction of the input signal.

The present improvements involve the use, in an audio-frequency circuit, of an improved type of volume compression control action in conjunction with a further volume compression arrangement which is of a more or less conventional A. V. C. type, whereby certain highly desirable output characteristics are attained, principally in the control attack and recovery times.

It is an object of the invention to provide an improved output control circuit for an audio-frequency amplifier or related sort of system, for example, a multiple stage miniature amplifier circuit of the type commonly employed in the small, portable hearing aids, which control circuit includes an improved volume compression operation featuring the variable regulation of the screen grid voltage at an intermediate amplifier stage to control the gain of the latter in accordance with the variable alternating current output voltage at a later stage, this in combination with an A. V. C. circuit acting to reduce the gain of a stage or stages of the circuit by varying the control grid bias of said stage or stages in response to an excessive output surge, thereby to provide an improved audio-frequency control system characterized by its exceedingly rapid attack and recovery times.

Another object is to provide a control circuit of the type referred to in the preceding paragraph in which the variable regulation of screen grid voltage at said intermediate stage is accomplished through the agency of a volume compression control tube having a control grid which is subject to a bias, preferably obtained from said later output stage, which is sufficient to render said control tube non-conductive in the absence of an input signal on the amplifier circuit, and to vary said control tube screen grid potential in inverse relation to the power at said output stage.

Yet another object is to provide a control circuit of the sort referred to in which the screen grid of the control tube is directly connected to the screen grid of the intermediate stage to alter the gain thereof in inverse relation to the power output of the amplifier.

A still further object is to provide a control circuit for audio-frequency amplifiers which includes an improved volume compression type of control circuit as described above.

A more specific object is to provide a system of audio-frequency power output control in a multi-stage amplifier or other related type of circuit, including a variably operable volume compression control tube or device having a control element which is normally biased to cut-off condition when no input signal is received by the circuit, said tube being provided with means to adjust the value of control element bias as desired and having a screen grid or equivalent element which is variably charged during the conduction phase of the control tube in response to variations in said control element bias, said last named element being operatively connected in a novel manner to still another stage or stages of said amplifier to vary the gain of the latter.

Yet another specific object is to provide a system of the type referred to in the preceding paragraph in which the variably charged screen grid or equivalent element of the volume compression control tube is operatively connected to a corresponding screen grid or element of said further stage or stages, and in which the hookup described is employed in combination with a further automatic volume control hookup functioning to variably bias the input control element of one or more amplifier stages.

Generally considered, it is an object of the invention to provide an audio-frequency circuit, preferably a multi-stage, miniature amplifier circuit, which is controlled by a combination of two types of volume compression circuits energized from the output side of the system to prevent power output from exceeding a predetermined level, which combination of circuits is characterized by very fast attack and recovery times in performing its control functions, thereby adapting the same particularly to a hearing aid installation.

A single embodiment of the invention is presented herein for purpose of illustration, but it will be appreciated that the invention is susceptible of incorporation in other modified forms coming equally within the scope of the appended claim.

In the drawing, the figure is a schematic wiring diagram of a multiple stage, audio-frequency, hearing aid amplifier circuit which incorporates the improved output control features of the invention.

Referring to the schematic wiring diagram, the same, in general, reproduces the amplifier and output circuit of a well known hearing aid, as modified to include the control features of this invention. Inasmuch as most of the arrangements for coupling the various stages of the amplifier and for supplying energizing and/or biasing voltage to the electrodes of the respective space discharge devices of the amplifier are conventional, they will not be described in detail and are not particularly designated in the drawing. In the interest of simplicity and clarity, only those parts, connections or relations will be referred to, and particularly designated by reference numerals, which enter into the actual operation of the control circuit and those components of the amplifier which are affected in the operation of the control circuit.

The reference numerals 10, 11 and 12 designate voltage amplifier tubes of the first three stages of a five-tube hearing aid amplifier circuit in which the features of the invention are incorporated, for purpose of illustration. These are sub-miniature filamentary-type, five-electrode tubes of variable mu, such as are commonly employed in hearing aid amplifier circuits. They are resistance-capacity coupled in a fashion which is conventional in this type of hookup.

The reference numeral 13 designates a volume compression control tube of similar type, the function of which is to act as a rectifier and gain control element, as hereinafter explained. Its screen grid is connected by the lead 14 directly to the screen grid of the third-stage amplifier tube 12, and the thus joined screen grid terminals are connected through a grid load resistance 15 to the positive B-battery terminal. The screen grids are by-passed to ground by the capacitor 15′.

The plate of tube 13 is connected through an isolating resistor 16 and a coupling capacitor 17 to the plate of power amplifier tube 18. The latter is connected to the output transformer 19 feeding earphone 20.

A lead 21 connects the plate of tube 18 to the negative B-battery terminal through a capacitor coupling 22 and a voltage divider network including series-connected resistors 23 and 24. The control grid of the volume compression control tube 13 is adjustably tapped to the resistor 24 by the manually adjustable contact 25. The cathode of said tube 13 is grounded by the lead 26 and a resistance-capacitative parallel network consisting of resistor 27 and capacitor 28 connects the negative side of the resistor 24 with ground.

The values of the components just described are chosen and the setting of potentiometer contact 25 is made such that the control grid of the tube 13 is normally biased beyond cutoff by a D. C. potential which is negative with respect to the grounded filament of said tube, when there is no signal at the input side of the amplifier. Under this circumstance the tube 13 does not conduct. When the system is in operation and when the alternating voltage derived from the plate of tube 18 is sufficiently positive with respect to the cathode of tube 13 to overcome the bias voltage, said tube begins to conduct on the positive portion of the wave form. This conduction produces a voltage drop across a load resistor 15 serving to lower the voltage on the screen grid of the third-stage amplifier tube 12, thus dropping the output voltage and power of the system. The attack time of this gain reducing action is almost instantaneous, since it is only dependent upon the time of discharge of voltage of the capacitor 15′ by volume control tube 13.

When the portion of the output voltage of amplifier tube 18 which is applied to the control grid of tube 13 drops to a value too low to overcome the bias voltage on that tube, the latter ceases conducting. Accordingly, its screen grid current flowing through the common screen grid load resistor 15 ceases, allowing the voltage on the screen grid of tube 12 to rise to its former value. This restores the gain of tube 12. The time for voltage recovery in this fashion depends solely on the time of charging condenser 15′ through resistor 15.

The system embodies a second type of power output control by volume compression, i. e., by control of the grid bias of the second and third-stage amplifier tubes 11 and 12, respectively. A portion of the output of the power amplifier tube 18, which is obtained across the capacitative coupling at capacitor 17 through the isolating resistor 16 and the grounded resistor 30, is employed for this purpose. This alternating voltage is in phase with the voltage derived from the plate of tube 18 and applied to the control grid of the volume compression control tube 13, as described above.

When tube 13 goes into conduction on the positive portions of the input wave form, a positive potential with respect to the cathode of tube 13 is impressed on the plate of tube 13, and the alternating voltage across resistor 30 is detected by tube 13. This detected voltage is filtered by a two-stage filter consisting of resistor 31 and capacitor 32, and resistor 33 and capacitor 34, arranged in shunt with resistor 30. A potential which is negative with respect to ground is obtained at the junction of capacitor 34 and resistor 33, which negative voltage is applied as a bias to the control grid of the second-stage amplifier tube 11 through the adjustably tapped resistor 35, and to the control grid of third-stage amplifier tube 12 through the resistor 36. The gain of tubes 11 and 12 is dropped accordingly to lower the output voltage and power. The attack time of the action is dependent on the voltage charging time of capacitor 32 through resistor 31, and, to a substantially lesser extent, on the voltage charging time of capacitor 34, inasmuch as the capacitor 32 is much larger than capacitor 34. The recovery time is similarly dependent on the discharge time of capacitor 32 through resistors 31 and 30, being approximately twice the attack time.

Accordingly, when that portion of the output voltage which is applied to the plate of volume compression control tube 13 diminishes to a value too low to overcome the bias voltage, said plate no longer draws electrons from the tube cathode, the alternating voltage across resistor 30 is no longer detected by the tube, and the capacitors 32 and 34 discharge. The discharge in turn removes the negative voltage from the control grids of tubes 11 and 12, returning the gain of said tubes to normal.

This system of power output control, by the twin expedients of dropping the gain of amplifier 12 through control of its screen grid potential and of dropping the gain of amplifier tubes 11, 12 through control of control grid bias, is adaptable for use in circuits which have any number of amplifier tubes preceding or following the point from which the control signal is taken. This is done by making the proper circuit connections whereby the screen grid voltages of these tubes are lowered by the control tube 13 when the latter goes into conduction and whereby the negative voltage developed by the detecting action of the plate of the control tube 13 across its load resistor 30 is applied to the grids of all these tubes when said control tube goes into conduction.

The foregoing arrangement provides a circuit insuring a substantially constant output level, having the fast attack and recovery times essential in a hearing aid installation, in which unduly slow attack is apt to result in injury to the user and unduly slow recovery in distortion or loss of sound values. Generally, the invention resides in a combination of an improved principle of volume compression control with a more or less conventional automatic volume control operation, which combination is especially suited for use in miniature audio-frequency amplifier installations, in which it has heretofore been difficult to achieve both fast attack and fast recovery.

I claim:

An audio-frequency signal transmitting circuit comprising a thermionic power modifying tube having a cathode, an anode and a screen grid element, a further thermionic power modifying tube having a cathode, an anode, a control grid element, and a screen grid element connected to the screen grid element of said first tube, an output tube having a cathode and an anode, a circuit including a series-connected resistor and capacitor connecting the anodes of said output and further tubes, a biasing circuit including a series-connected potentiometer resistor and capacitor connecting the plate of said output tube with the control grid element of said further tube, a source of biasing voltage connected to a low potential point on said last-named resistor and normally acting to bias said futher tube to cut-off condition, and biasing means including a D. C. source and a load resistor connecting said D. C. source to said screen grid elements whereby to vary the output of said first tube in inverse relation to the rate of conduction of said further tube, as determined by the biasing of its control grid element by said output tube.

STANLEY K. WEBSTER.

REFERENCES CITED

The following references are of record in the file of this patent:

UNITED STATES PATENTS

| Number | Name | Date |
|---|---|---|
| 2,020,363 | Landon | Nov. 12, 1935 |
| 2,092,496 | Branson | Sept. 7, 1937 |
| 2,096,759 | Purington | Oct. 26, 1937 |
| 2,207,905 | Weagant | July 16, 1940 |
| 2,363,985 | Moser | Nov. 28, 1944 |
| 2,420,686 | Shaper | May 20, 1947 |
| 2,428,039 | Royden | Sept. 30, 1947 |
| 2,434,929 | Holland et al. | Jan. 27, 1948 |
| 2,497,835 | Loper | Feb. 14, 1950 |